(12) United States Patent
Burden

(10) Patent No.: X4125
(45) Date of Patent: May 26, 1825

(54) NAILS, WROUGHT

(76) Inventor: Henry Burden

Henry Burden,
Letters Patent. Patented May 26. 1825

The Schedule referred to in these Letters Patents and making part of the same, containing a description in the words of Henry Burden himself, of his improvement in the manufacture of wrought nails or spikes, solely by the aid of machinery.

I make use of a fixed frame of cast or wrought iron, the side pieces and ends being four inches square, larger or smaller as may be deemed necessary.—The one now in operation is four feet long and eighteen inches wide inside; at the one end of the frame is fixed the crank shaft, on which is the fly wheel and pulley, from which a belt or other gearing may be attached to give motion to the machine. About the middle of the fixed frame is the two posts, a part of which is under the other projection above the frame through which the rollers move on their centers or axis which rolls out the nail. On the inside of the fixed frame are four brasses on which the moving frame slides forward and back-ward.—these brasses, two of which are moveable (one side) lying in grooves in the fixed frame by means of screw bolts passing through the sides of the fixed frame, to make the moving frame play tight as occasion may require. The moving frame may be made of cast or wrought iron,—the one now in operation is cast iron, two feet long and eighteen inches wide, resting on the brasses at the four corners;—on the one end of said frame is attached the pitman or connecting rod which, being connected with the crank, gives motion to the machine. On one side of said frame is fastened a straight rack seven inches long, having cogs in it to give motion to two rollers which swedge or roll out the nail.. On the same side of the moving frame to which the rack is fastened is a place for one of the side steels between which the rod is fastened. This steel is about one inch thick, three inches wide and the length of the nail required, is moved as occasion may require, by screw bolts on the side and ends. Opposite this steel a-bout two inches distant is a moving lever, one end of which is fastened through a mortice by means of a bolt or pin in the one end of the moving frame.—In this lever is a place for the other side steel, the dimensions of which is the same as the one above described, and is fastened by bolts in a similar manner. By means of these bolts, the side steels may be moved so as to admit the rod and swedges or rollers that roll out the nail. Parallel with the side steels and on a line with the center of the two, is the header, the end of which being set at the distance of the thickness of the head from the ends of the side steels. This header moves in a mortice or groove by a crooked lever of cast or wrought iron, the end of which being fastened by a pin or bolt passing through into the moving frame and passing along at right angles with the header until the end intersects the side of the fixed frame, on which is a wedge; so that when the moving frame is put in motion, the wedge that is fixed on the fixed frame, pushes or presses the end of the heading lever as it passes along, by which means the header is pressed forward just enough to press the head sufficiently,—which is always governed by the angle and shape of the wedge. Through the heading lever where it [illegible] the header is a screw bolt, the end of which bears against the end of the header, which by turning
graduates the thickness of the head of the nail. The moving lever in which one of the side steels is fastened is
given motion to by a similar wedge to that of the one on the other side of the fixed frame, which gives motion
to the header: this wedge is so shaped, that when the lever passes along, as it is moved by the moving frame; it
closes as the rod enters between the side steels & remains so until the nail is rolled out, where by means of
the wedge tapering at the other end, the lever opens and lets the nail drop. The rollers alluded to in the foregoing
description, one of which being placed between the two posts which is connected with the fixed frame;
this roller being fixed on moveable centres, which centres pass through the lower end of the post under the
frame fastened by screw bolts parallel to this roller, and ten inches above, lays the other roller, fastened by means
of moveable centers passing through the upper ends of the posts; these centers being fixed by screws in the same
manner as the under centers are. Connected with these rollers is an open mortice on one end of each wherein
is fastened by means of screw bolts, two segments of a circle whose radius is five inches, and periphery is [illegible]
inches, on the periphery of these segments are cogs, which mesh into each other; one set of which cogs, being
double the length of the other: this extra length of cog is calculated to mesh into the straight rack which
~~[illegible]~~ is fastened into the side of the moving frames towards the center of said rollers is an open mortice.
wherein is fastened by means of screw bolts, two segments of a circle made of cast or other steel whose radius
is five inches and periphery the same length of the side steels and nail intended; these segments or swedges
the edges of which being precisely the same thickness as the nail intended are each separately fastened perpen-
-dicularly to the horizon; with these edges or peripheries facing each other, these segments or swedges being placed
by means of screw bolts, so that these edges ... play easily between the two side steels leaving the precise distance
betwixt their edges as the thickness of the nail intended.
The iron being slit into rods of a suitable size; the thickness of which being always the same as the nail intended,
and as much wider as is found necessary to prevent the nail from slipping between the swedges and side steels while
the head is putting on. The rod being heated is admitted into the machine on its edge, the end of which bears close to the
header and is confined on the sides by the two side steels which are fastened in the moving frame so that the iron cannot escape,
the two rollers or swedges being put in motion by the crank through the moving frame gradually tapering the nail to the point
where the two swedges meet together and cut off the nail:- in this situation the nail remains betwixt the two side steels
on the sides and header in front, when the moving lever in which is fastened one of the side steels opens and
and lets the nail drop.
Secondly, I claim as my invention and improvement the following method of making wrought nails or spikes. in
lieu of the side steels formerly described, between which the rod or nail is confined while the swedges or rollers shape
or roll out the nail, I take two swedges or rollers, similar to those perpendicular ones which roll the nail having the
edges the same thickness of the side steels, one of these swedges or rollers being placed (horizontally) on each of the vertical (or these side swedges or rollers
perpendicular swedges or rollers being fastened by means of screw bolts into cast iron rollers which stand perpendi-
-cularly to the horizon fastened by moveable centers at both ends. These swedges or rollers being moved together with the
vertical swedges or rollers by means of gearing to the moving frame; then the rod being heated is introduced between the
two horizontal swedges or rollers on the sides of the vertical or perpendicular swedges or rollers on the upper
or under sides and header in front; all of which being put in motion by the crank shaft through the moving
frame formerly described. by which means the rod is gradually tapered on the sides, by the side swedges or rollers,
while the vertical or perpendicular swedges or rollers taper from the upper and under side until it is entirely
cut off at the point, the head being put on in the manner above described. In this manner, nails may be made
tapering from all the four sides terminating in points as those made under the hammer. Under the first head
described the nails are only tapered from two sides by the two vertical or perpendicular swedges or rollers
while the nail is confined between the side stiles.

Thirdly, I claim as my invention and improvement the following method for making wrought nails or [illegible]-
I take two rollers of cast or wrought iron case hardened, steel, or any other substance which may be considered
answerable for the purpose. These rollers are first turned smooth to any given size. for example suppose
they were six inches in diameter, and twelve inches long, their circumference being eighteen and two eighth inches
(nearly) with these rollers I calculate to make or prepare iron for nails of any given size. I turn grooves
into the rollers for every sized nail intended to be made, the width of these grooves being precisely the
width of the thickness of the nail intended, and a little deeper. On the other roller I turn down having
projections or swedges of similar sizes of the grooves in the other roller divided accurately, so that each pro-
-jection or swedge, will fit exactly into each respective groove; thus the vacant spaces are turned down
a sufficient depth so as to admit these projections or swedges to be inserted in their respective grooves-
Then divide the circumference of each projection or swedge into an equal number of distances as there may
be lengths of nails intended, for example- suppose a six penny nail to be two and five eighth inches long, seven of
these would extend round the periphery of the roller. then divide the projection into seven equal parts; take a file and
reduce the projection at one of these points enough down so as to be equal to the difference between the size of the nail at the
head, and that of the point. thus gradually lessening the quantity taken off, until you arrive at the next point or mark,
terminating at nothing, which will of course shape the taper and point of the nail when in operation. thus having formed the
projection and groove so as to form a true taper to one nail, file or reduce the remaining six spaces of the projection or swedge,
fitting it so as to have two heads & two points alternately together- thus one revolution of the rollers will make seven nails without
heads. The iron being slit into rods of suitable sizes, is heated, and after passing through the grooves or swedges is formed into
as many nails or points as they are in length of nails. These rods after being rolled or swedged are cut by means of shears at the
head and point. These points or nails being heated in a furnace may be headed by hand, or in the usual way of heading cut nails by
the aid of machinery.

Fourthly. I claim as my invention and exclusive right all the combinations and improvements described under the three
former heads, and as there may be an immensity of combinations, or methods combined, whereby wrought nails or spikes
may be made by the aid of machinery, the principle being given, I wish it particularly understood that whether they are made by means
of grooved rollers having their surfaces or grooves so shaped as to give the required taper to the rod, at each length of nail as is de
=scribed under the third head. Or whether sections or segments of these rollers or swedges may be taken and fastened into vibrating levers
or axles. Finishing the nail or spike in one operation, as is described under the first head, all or any of those above described,
or any other combination of plans so long as the nail or spike is shaped by means of rotary or vibrating swedges or rollers or
sections of rollers whose peripheries or surfaces are so shaped as to give the desired taper to the nail or rod while it is in contact between
said rollers or swedges.

Being the first who has ever made wrought nails or spikes in this manner, I consider the same as my exclusive right and privi
=lege. In all the methods above described, the wrought nails or spikes are not pressed smaller under the head than the body of the nail, but
is the full size similar to those made by the hand. I use a counter sunk hole in the end of the header which makes the head of the
nail or spike high in the centre as those made by the hammer.

This latter invention I do not claim farther than the application to my method of making nails.

Henry Burden.

Witnesses
Elam Buel
Robert Christie.

([illegible] words)

([illegible] October [illegible] 1839 - Examined by [illegible])